No. 609,665.  
H. DURHAM.  
BROOM.  
(Application filed Oct. 27, 1897.)  
Patented Aug. 23, 1898.
(No Model.)
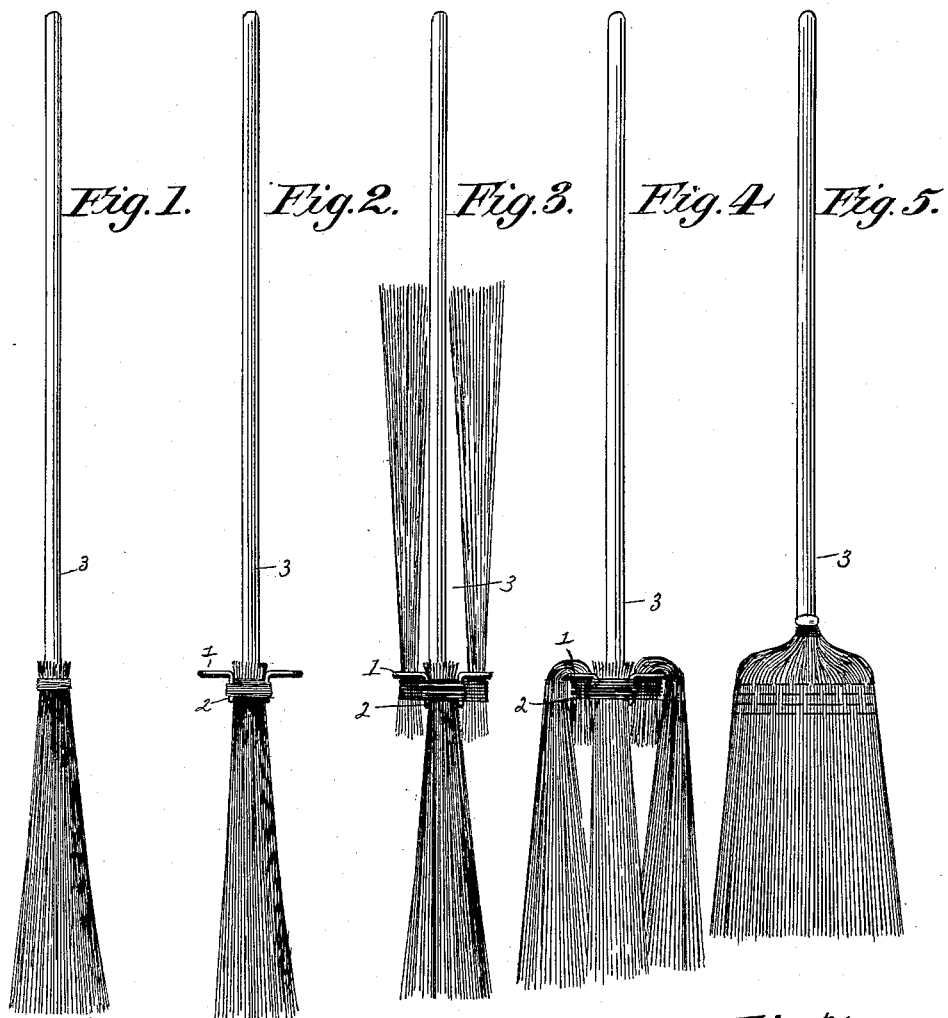
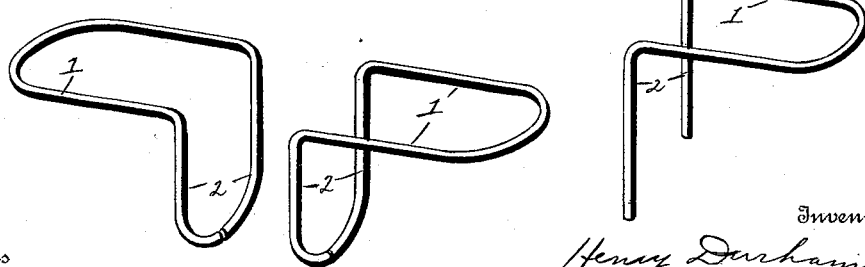

UNITED STATES PATENT OFFICE.

HENRY DURHAM, OF SYLVANIA, INDIANA.

BROOM.

SPECIFICATION forming part of Letters Patent No. 609,665, dated August 23, 1898.

Application filed October 27, 1897. Serial No. 656,557. (No model.)

*To all whom it may concern:*

Be it known that I, HENRY DURHAM, a citizen of the United States, residing at Sylvania, in the county of Parke and State of Indiana, have invented certain new and useful Improvements in Brooms; and I do hereby declare the following to be a full, clear, and exact description of the invention, such as will enable others skilled in the art to which it appertains to make and use the same.

My invention has relation to brooms; and it consists in the novel construction and arrangement of its parts, as hereinafter described.

The object of my invention is to provide a means for forming broad and square shoulders at the upper part of the broom-head.

In the accompanying drawings, Figure 1 is a side view of a broom, showing the first step in the process of manufacture. Fig. 2 is a side view showing the second step in the process. Fig. 3 is a side view showing the third step. Fig. 4 is a side view showing the fourth step. Fig. 5 is a side view of the bracket, showing the squared and broad shoulders at the proper portion of the head. Fig. 6 is a perspective view of the brackets of one form used in the manufacture of the broom. Fig. 7 is a perspective view of another form of a bracket.

The brackets consist of the substantially horizontal portion 1, said portion being link-shaped, and a perpendicular portion 2. The bracket is made preferably of stiff wire, and when completed is in the shape of a link bent at an intermediate point at substantially right angles, as shown in Fig. 6. However, the bracket may be substantially U-shaped, as shown in Fig. 7, with the ends of the U bent at right angles to the remainder of the bracket, thus forming the portion 2.

In the manufacture of the broom the first step is to secure a bunch of corn to the lower end of the handle 3 by winding it with wire, as shown in Fig. 1. The brackets are then secured in place, as shown in Fig. 2, the wire being wound about the portions 2 2, the portions 1 1 extending substantially horizontal. A bunch of corn is then inserted with the butt-ends from the top down through the openings of the portions 1 of the brackets, as shown in Fig. 3. The wire is then wound around the butt-ends of the two bunches, and when the said ends are firmly secured the bunches are bent over the bowed ends of the brackets, as shown in Fig. 4. The butt-ends of the bunches fill up the intervening spaces between the upper portions of the twisted bunches and the bunch secured to the handle 3. The brackets hold the two said bunches in their proper positions and form the shoulders of the broom-head. The bunches, as shown in Fig. 4, are then covered, and the exterior of the broom-head is formed, the corn being substantially stitched together, the broom when completed being substantially of the shape as shown in Fig. 5. After the corn is attached to the handle it is trimmed, as usual.

Having thus described my invention, what I claim as new, and desire to secure by Letters Patent, is—

1. In a broom, a handle, brackets consisting of horizontal link-shaped portions and perpendicular portions secured on opposite sides of the handle and broom-corn inserted with the butt-end from the top through said link-shaped portions, the corn then being bent over and secured in place.

2. In a broom, a handle, brackets consisting of horizontal link-shaped portions and perpendicular portions secured on the opposite sides of the handle and broom-corn inserted through said link-shaped portions and suitably secured in place.

In testimony whereof I affix my signature in presence of two witnesses.

HENRY DURHAM.

Witnesses:
A. L. CARNEY,
WARREN D. HEATH.